(12) United States Patent
Wåhl (10) Patent No.: US 9,219,756 B2
(45) Date of Patent: Dec. 22, 2015

(54) IMS NETWORK NODE TO ENABLE TROUBLESHOOTING AND A METHOD THEREOF

(75) Inventor: Johan Wåhl, Älvsjö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 367 days.

(21) Appl. No.: 13/992,452

(22) PCT Filed: Dec. 15, 2010

(86) PCT No.: PCT/SE2010/051381
§ 371 (c)(1),
(2), (4) Date: Jun. 7, 2013

(87) PCT Pub. No.: WO2012/082030
PCT Pub. Date: Jun. 21, 2012

(65) Prior Publication Data
US 2013/0254371 A1  Sep. 26, 2013

(51) Int. Cl.
*G06F 15/173* (2006.01)
*H04L 29/06* (2006.01)
*H04L 29/08* (2006.01)

(52) U.S. Cl.
CPC ............ *H04L 65/1003* (2013.01); *H04L 67/14* (2013.01); *H04L 67/146* (2013.01); *H04L 65/1016* (2013.01); *H04L 65/4007* (2013.01)

(58) Field of Classification Search
None
See application file for complete search history.

(56) References Cited

U.S. PATENT DOCUMENTS

| 2002/0080822 A1* | 6/2002 | Brown et al. ................. 370/475 |
| 2003/0026220 A1 | 2/2003 | Uhlik et al. |
| 2006/0200469 A1* | 9/2006 | Chidambaran et al. ......... 707/10 |
| 2008/0162634 A1 | 7/2008 | Johns |
| 2009/0034472 A1* | 2/2009 | Purnadi et al. ................ 370/331 |

FOREIGN PATENT DOCUMENTS

WO  WO 2006/010526 A1  2/2006

OTHER PUBLICATIONS

International Search Report, PCT/SE2010/051381, Sep. 22, 2011.
Written Opinion of the International Searching Authority, PCT/SE2010/051381, Sep. 22, 2011.

* cited by examiner

*Primary Examiner* — Brian P Whipple
(74) *Attorney, Agent, or Firm* — Myers Bigel Sibley & Sajovec, P.A.

(57) ABSTRACT

The embodiments of the present invention provide a solution in an IMS network node for enabling troubleshooting. A global session identity indicator (GSII) is introduced which can be used for identifying messages belonging to the same session.

21 Claims, 7 Drawing Sheets

IMS NETWORK NODE TO ENABLE TROUBLESHOOTING AND A METHOD THEREOF

CROSS REFERENCE TO RELATED APPLICATION

This application is a 35 U.S.C. §371 national stage application of PCT International Application No. PCT/SE2010/051381, filed on 15 Dec. 2010, the disclosure and content of which is incorporated by reference herein in its entirety. The above-referenced PCT International Application was published in the English language as International Publication No. WO 2012/082030 A1 on 21 Jun. 2012.

TECHNICAL FIELD

The embodiments of the present invention relates to a method and a network node for enabling troubleshooting, and in particular to a solution for troubleshooting in an Internet Protocol Multimedia Subsystem (IMS).

BACKGROUND

A number of different signaling protocols are used in an Internet Protocol Multimedia Subsystem (IMS) network, such as Session Initiation Protocol (SIP) and Diameter. Further, the signaling associated with a session involves many different nodes. When troubleshooting in an IMS network it is desirable to identify all messages associated with a certain session. When considering the SIP signaling, it is possible to look at a parameter referred to as Call-ID. By detecting the same Call-ID value in different signaling messages it is possible to conclude that these messages belong to the same session. However, there are no mechanisms today which enable a troubleshooter to find the corresponding Diameter (or other non SIP protocol) messages for that specific session in an easy way.

There are also issues, from a troubleshooting perspective, when entities acting as B2BUAs (Back to Back User Agent) are involved. Example of B2BUAs are application servers, border gateways etc. The B2BUAs change the Call-ID value when they "forward/proxy" a SIP message, i.e. they start a new SIP dialogue. This implies that messages belonging to the same session (but different dialogs) will have different Call-ID values and it is therefore not possible to identify all messages belonging to the same session.

SUMMARY

An object of the embodiments of the present invention is to provide a solution for identifying messages belonging to the same session.

This is achieved by introducing a global session identity indicator (GSII) in messages which indicates the session which the message belongs to.

According to a first aspect of embodiments of the present invention, a method in an IMS network node for enabling troubleshooting is provided. In the method, a message associated with a first session is received, it is then checked whether the message comprises a global session identity indicator. If it is determined that the message comprises the global session identity indicator a value of the global session identity indicator is the determined in the received message and said value is inserted as the global session identity indicator in any subsequent messages sent from the IMS network node relating to the first session. If it is determined that the received message does not comprise the global session identity indicator then a global session identity indicator value is associated with the first session, and said value is inserted as the global session identity indicator in any subsequent messages sent from the IMS network node relating to the first session. Finally, the subsequent messages are sent.

According to a second aspect of embodiments of the present invention an IMS network node for enabling troubleshooting is provided. The IMS network node comprises an input/output unit configured to receive a message associated with a first session and a processor configured to check whether the message comprises a global session identity indicator. The processor is further configured to determine a value of the global session identity indicator in the received message, and to insert said value as the global session identity indicator in any subsequent messages sent from the IMS network node relating to the first session when it is determined that the message comprises the global session identity indicator. The processor is further configured to associate a global session identity indicator value with the first session and to insert said value as the global session identity indicator in any subsequent messages sent from the IMS network node relating to the first session when it is determined that the received message does not comprise the global session identity indicator. Moreover, the input/output unit is configured to send the subsequent messages.

An advantage with embodiments of the present invention is that the messages belonging to one session can be detected. This implies that troubleshooters will be able to find all signaling related to a session very fast which will speed up troubleshooting time.

DETAILED DESCRIPTION

The embodiments of the present invention will be described more fully hereinafter with reference to the accompanying drawings, in which preferred embodiments of the invention are shown. The embodiments may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

Moreover, those skilled in the art will appreciate that the means and functions explained herein below may be implemented using software functioning in conjunction with a programmed microprocessor or general purpose computer, and/or using an application specific integrated circuit (ASIC). It will also be appreciated that while the current embodiments are primarily described in the form of methods and devices, the embodiments may also be embodied in a computer program product as well as a system comprising a computer processor and a memory coupled to the processor, wherein the memory is encoded with one or more programs that may perform the functions disclosed herein.

Figure 1:
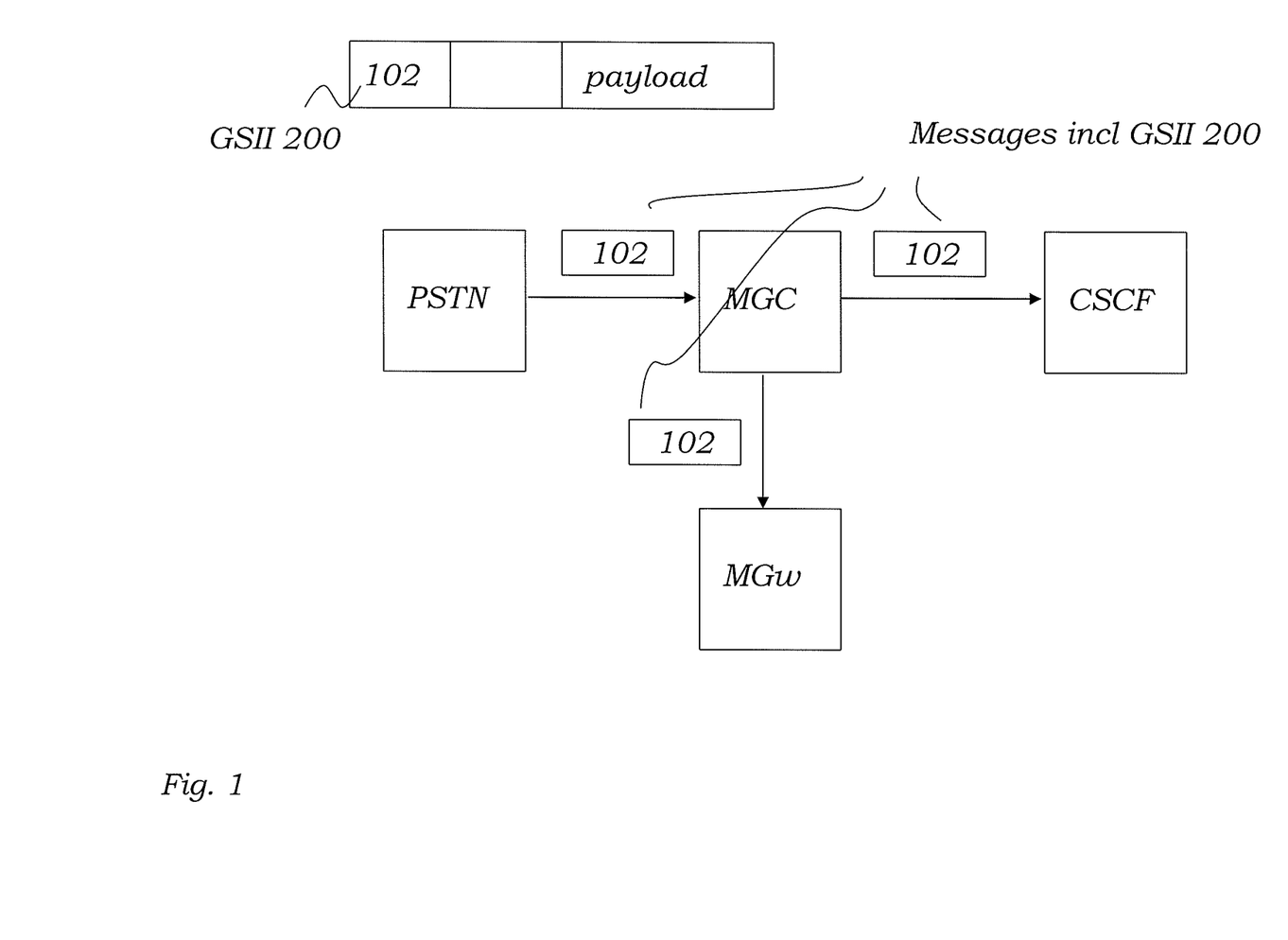
FIGS. 1 and 2 illustrate two scenarios in an IMS network where the embodiments of the present invention are applicable.
Figure 4:
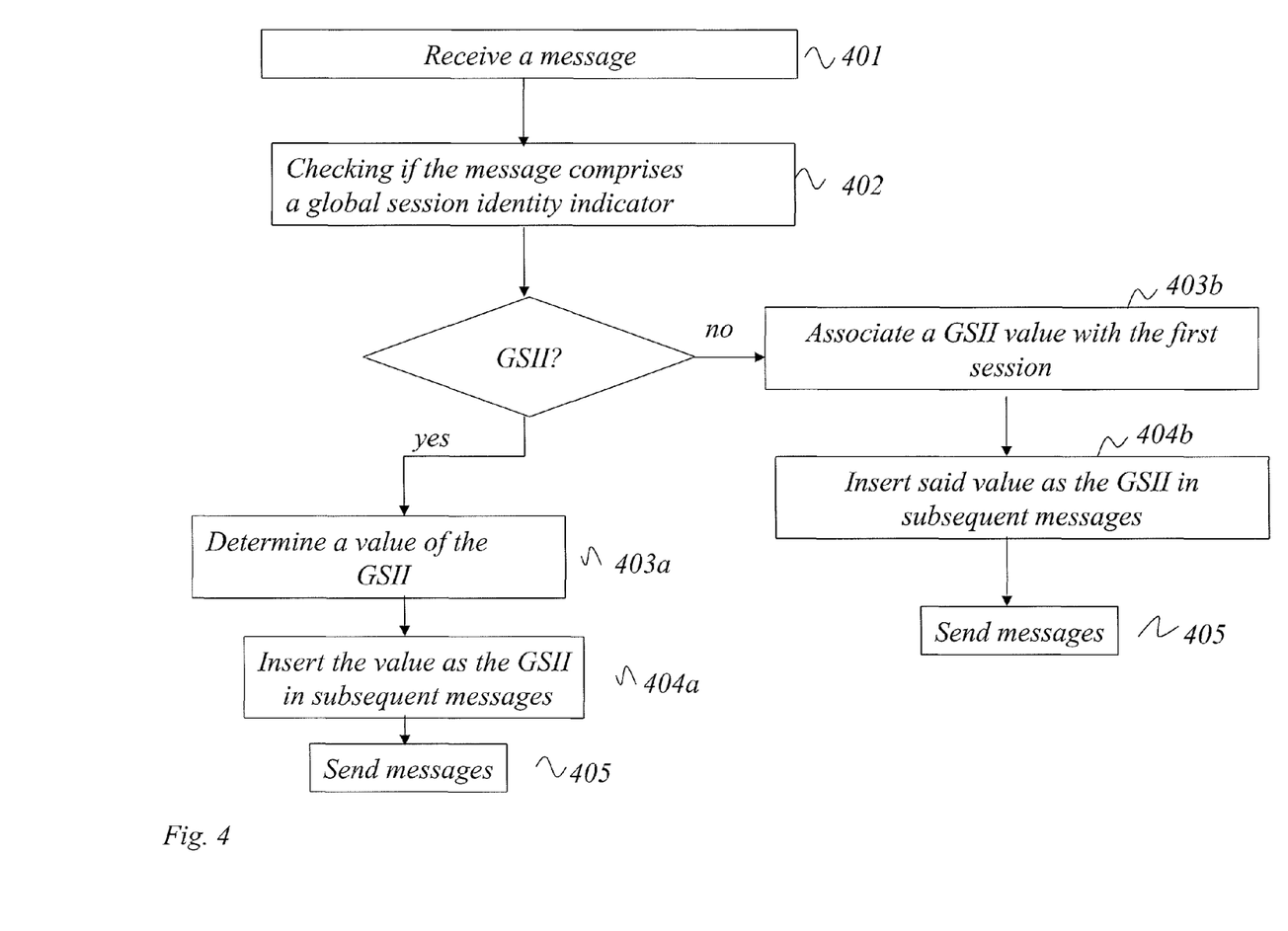
FIGS. 4 and 5 are flowcharts of methods according to embodiments of the present invention.

The embodiments of the present invention provide a solution in an IMS network node for enabling troubleshooting. A global session identity indicator (GSII) is introduced which can be used for identifying messages belonging to the same session. This is further explained with reference to FIGS. 1 and 4. FIG. 1 illustrates nodes in an IMS network, wherein a GSII value 200 is inserted in the messages. The GSII value is exemplified as "102" in FIG. 1. In the scenario of FIG. 1, the GSII value 200 is inserted in a message associated with a first session sent from a Public Switched Telephone Network (PSTN). As illustrated in the flowchart of FIG. 4, an IMS node, exemplified by the Media Gateway Controller (MGC) receives 401 the message. Upon reception of the message, the MGC checks 402 whether the message comprises a GSII 200 nor not. If it is determined that the message comprises the GSII 200 then the MGC determines 403a a value of the GSII in the received message, and inserts 404a said value as the GSII 200 in any subsequent messages sent from the IMS network node relating to the first session.

On the other hand, if it is determined that the received message associated with the first session does not comprise the global session identity indicator, e.g. because the PSTN node is not configured to insert the GSII 200 according to this embodiment, the MGC node can initiate insertion of the GSII 200 in the messages. Accordingly, the MGC associates 403b a global session identity indicator value with the first session, and inserts 404b said value as the global session identity indicator in any subsequent messages sent from the IMS network node relating to the first session. It may also insert said value as the global session identity indicator in the received message as well such that this message is possible to associate with the first session.

When the MGC node has inserted the GSII value in the subsequent messages, it sends 405a,b the subsequent messages.

The IMS node is either a stateful server or a stateless server. Stateful servers are able to store information while stateless servers are not able to store any information. Hence if the MGC is a stateful server, it comprises a memory for storing 406 a mapping between the global session identity indicator and a local protocol dependent session identity indicator.

Figure 2:
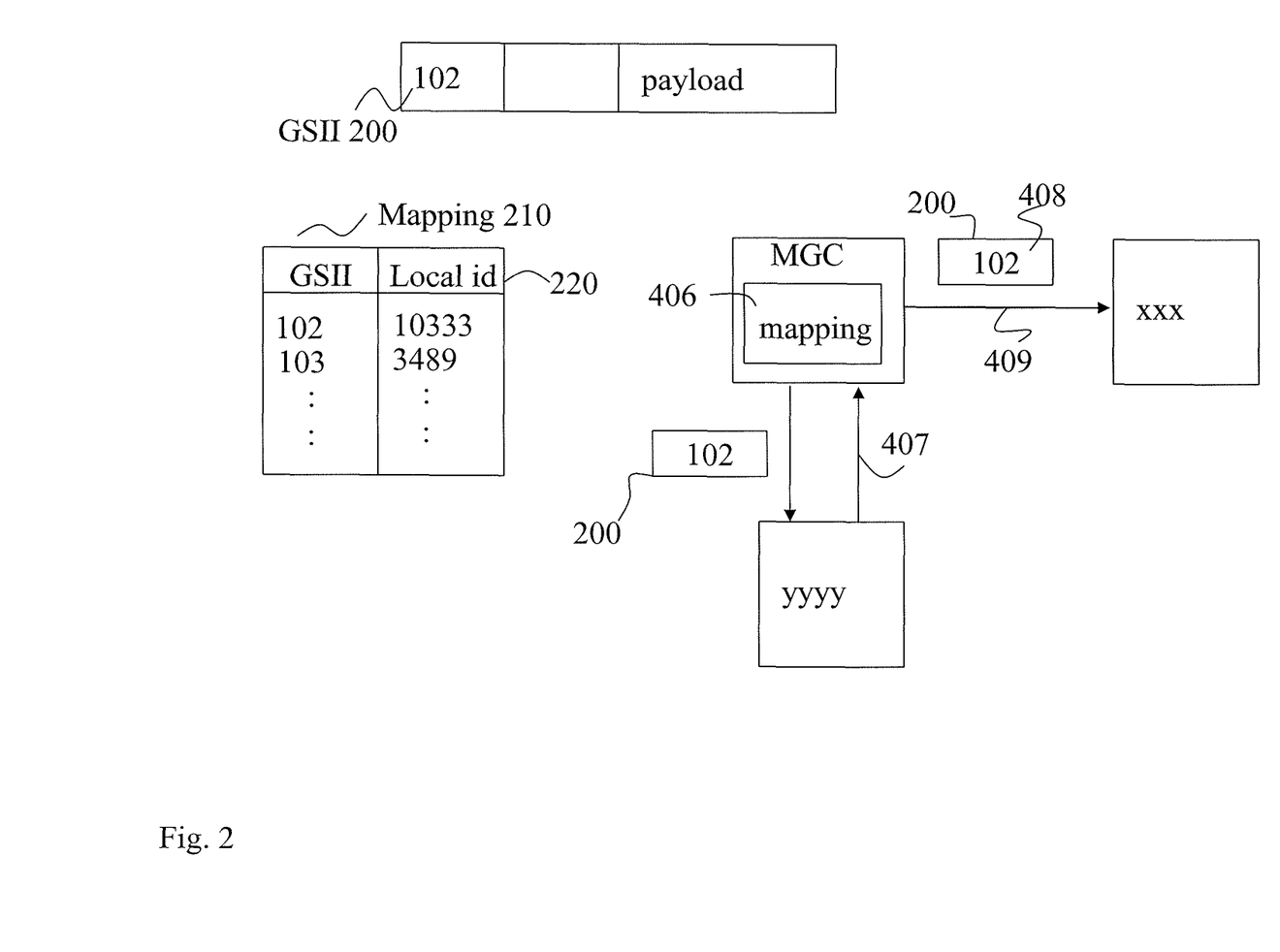
Figure 5:
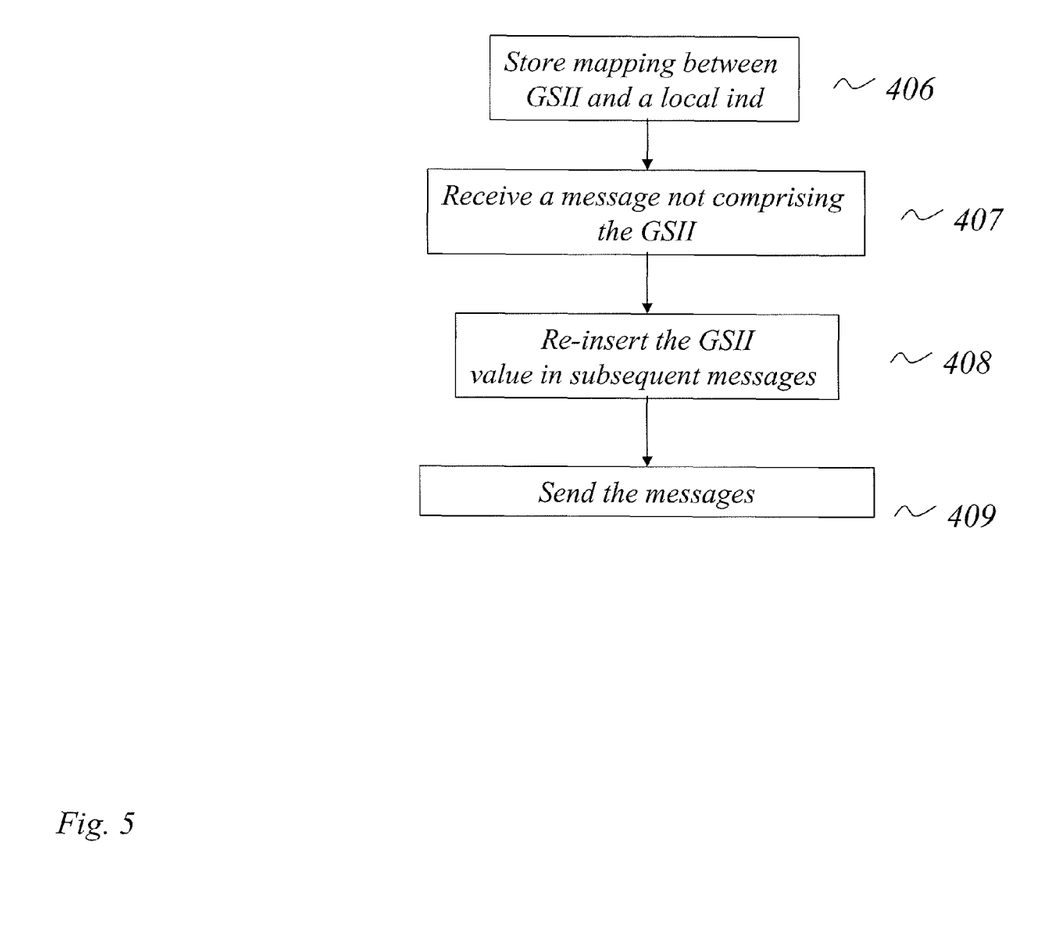

According to a further embodiment illustrated in FIGS. 2 and 5, the IMS node, exemplified by the MGC node, may send a request to another node which is not configured to handle the GSII 200. In this case, the MGC stores the mapping 210 between the GSII 200 and a local session identifier 220, identifying the first session. Hence, the MGC node receives 407 a message not comprising the GSII 200 relating to the first session. The received message is a response of a request sent by said IMS network node, whereby the request comprised a GSII value 200 here exemplified as "102". The MGC node then re-inserts 408 the value, which was comprised in the request, as the global session identity indicator in any subsequent message sent from the MGC node relating to the first session. The MGC node may also re-insert the GSII value in the received message, enabling this message trackable. Accordingly, the subsequent messages are sent 409 to their respective destination.

According to an embodiment of the present invention, the global session identity indicator (GSII) is inserted in a header of the message. An example where this is applicable is when the message is a SIP message and the local protocol is SIP accordingly. Further, in the case of SIP the local protocol dependent session indicator may be a call-id and the GSII is inserted in the SIP header which is a text string. It should be noted that the GSII value may also be inserted in the payload of the message.

According to a further embodiment, the global session identity indicator is inserted in an Attribute-value pairs (AVP) field. An example where this is applicable is when the message is a Diameter message and the local protocol is Diameter accordingly. Further, in this case the local protocol dependent session indicator may be a hop-hop identifier or an end-to-end identifier. These might, however, differ within the same session, i.e. they are only used for a specific query/answer.

In order to create GSII values that are "enough unique" among ongoing sessions the GSII may depend on an IP address of an IMS network node and/or the time for creating the GSII value. The IP address of the IMS network node, may be the IP address of the network node that creates the GSII.

To summarize, an IMS node according to embodiments of the present invention inserts the global session indicator referred to as the GSII in the messages that are sent from the IMS node to identify the sessions that the messages belong to. The IMS node may create the GSII value by itself or use a GSII value that is used by incoming messages related to the same session that the outgoing messages. A GSII value should be the same throughout the session.

It should be noted that if an IMS node is working in a client/server way, such as the CSCF and HSS, the response should contain the same GSII value as the request did. If the response contains answers to multiple queries, multiple GSII values should be returned.

Figure 6:
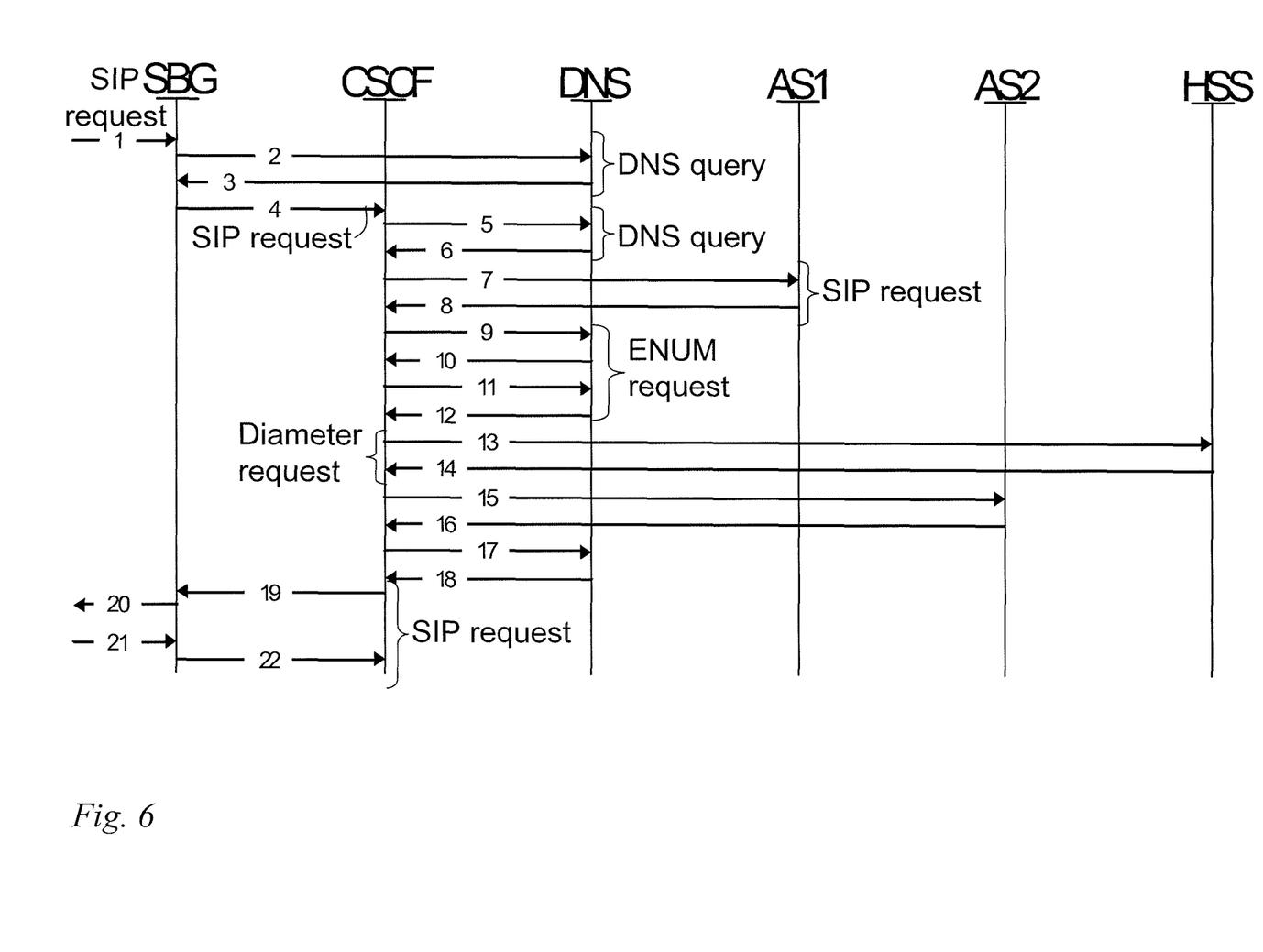
FIGS. 6 and 7 are signaling diagrams illustrating embodiments of the present invention.

The embodiments of the present invention are further explained below with reference to FIG. 6.

1. A session boarder gateway (SBG) receives a SIP request from a User Agent (UA)

2. The request does not contain a GSII value, so the SBG constructs one. To find the CSCF, the SBG performs a DNS query, in which the GSII value is included.

3. The Domain Name System (DNS) server sees the presence of the GSII value, so in the response to the query the GSII value is present.

4. The SBG sends the SIP request to the Call Session Control Function (CSCF) containing the GSII value.

5. The CSCF performs a DNS query and 6. gets a response, in which the GSII value is included and the SIP request is sent to the originating Application Server (AS).

7. The AS acts as a Back to Back User Agent (B2BUA) and starts a new transaction/dialogue when the SIP request is sent out, but the GSII value is proxied and is still included.

8. As the CSCF receives the GSII value, 9-12. it includes it in the ENUM request (to find out the corresponding SIP URI of the telephone number) and DNS request to the DNS server and when the SIP request received by the terminating CSCF, 13. it includes the GSII value in the Diameter request towards the Home Subscriber System (HSS)

14. which includes it in the response back.

15-18. Processing continues on the terminating side with the GSII token present.

19. CSCF sends out the SIP request to the terminating SBG and the SBG stores the GSII value.

20. The SIP request sent to the terminating UA (20) contains the GSII value.

21. The response from the terminating UA may not include the GSII value, 22. but as the SBG has stored it for this dialogue it will be present in the response back to the CSCF. Processing continues through the IMS network with the GSII value included.

The GSII value will be present for all subsequent signaling related to this dialogue.

Figure 7:
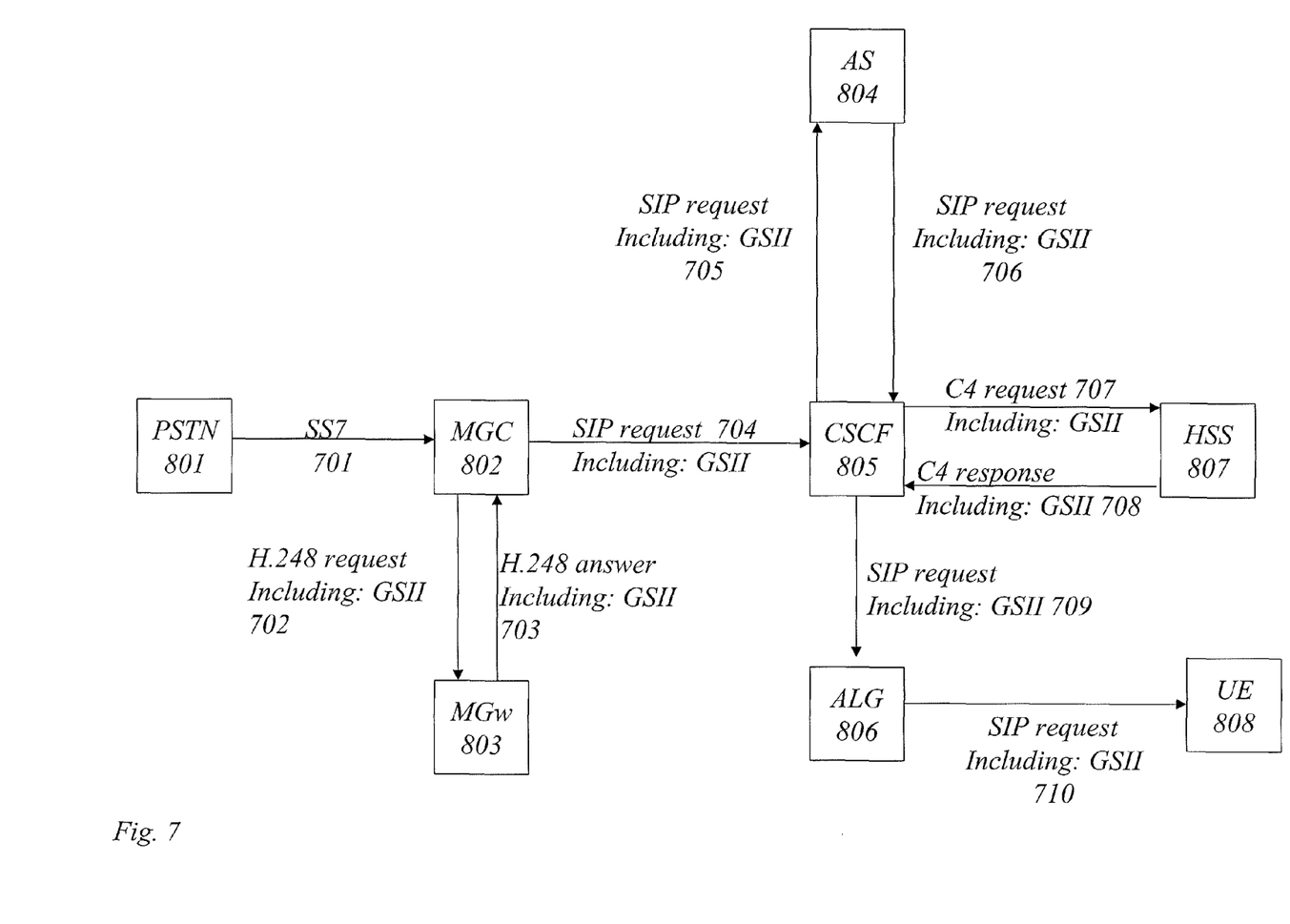

Another example is illustrated in FIG. 7 where a session is set up from a user in PSTN 801 to a user in an IMS network. The MGC 802 which is a signaling gateway receives a request 701 from the PSTN 801 to set up a session in the IMS network. The MGC 802 therefore generates a GSII value to insert in all signaling related to this session.

The MGC 802 sends a H.248 request 702 including the GSII value to the MGw 803 related to the session which is set up. In the H.248 communication, the MGw is used to check/allocate media resources for the session. The MGC/MGw works in a client/server relationship. As the request contained a GSII value, the GSII value will also be included in the H.248 answer 703. Further, the MGC 802 also sends a SIP request 704 to the CSCF 805 which is also related to the same session to inform the CSCF that a session will be set up to a user. As the SIP request 704 contained a GSII value, this is forwarded untouched to the AS 804. The AS 804 has to check if the terminating user has any services active, e.g. session forwarding. The AS then sends a SIP request back to CSCF 805 so that the terminating user can be alerted about the incoming call.

The AS 804 acts as a B2BUA, i.e. the AS starts a new session, referred to as SIP dialogue. However, as a GSII value was received in the request, the GSII value will be included in the SIP request sent out.

The CSCF 805 sends a Cx request 707 including the GSII value to the HSS 807 and the Cx response 708 from the HSS 807 to the CSCF 805 also includes the GSII value. The Cx request 707 is performed in order to ask the HSS 807 where the IMS user is registered.

The CSCF 805 sends a SIP request 709 including the GSII value to an Application Level Gateway (ALG) 806 since it still relates to the same session. This SIP request 710 is then forward to the UE 808.

Accordingly, for nodes that initiate signaling in to the IMS network will generate the GSII value and use it for all signaling related to the same session. It should be noted as illustrated in FIG. 7, B2BUAs and other network elements that normally start a new SIP dialogue/transaction when a request is received should proxy the GSII value. Nodes that work in a client/server relationship should also include this GSII value in the request and response.

Figure 3:
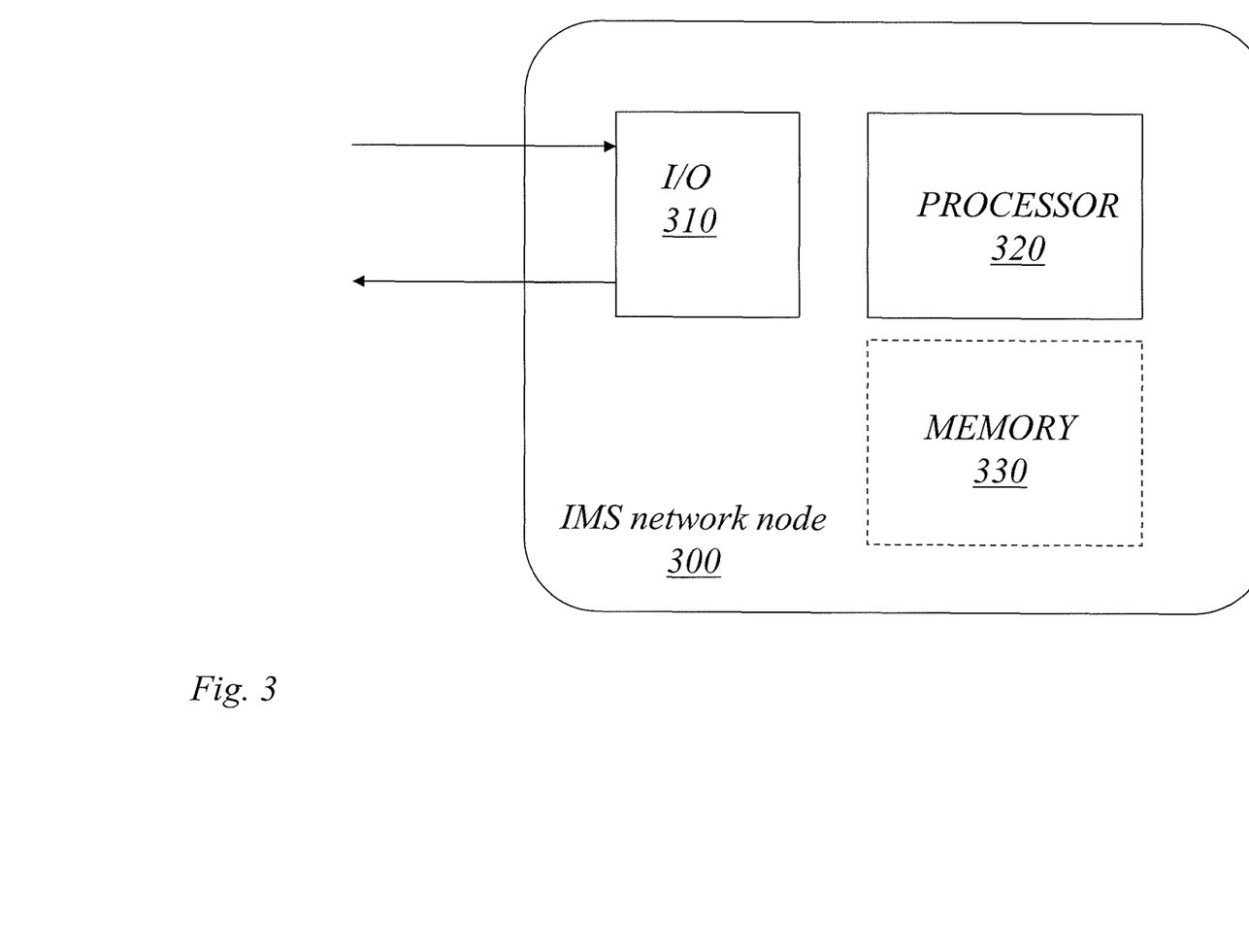
FIG. 3 illustrates an IMS network node according to embodiments of the present invention.

Turning now to FIG. 3 illustrating an IMS network node 300 for enabling troubleshooting according to embodiments of the present invention. The network node comprises an input/output unit 310 configured to receive a message associated with a first session and a processor 320 configured to check whether the message comprises a global session identity indicator. The processor 320 is further configured to determine a value of the global session identity indicator in the received message, and to insert said value as the global session identity indicator in any subsequent messages sent from the IMS network node relating to the first session when it is determined that the message comprises the global session identity indicator. Moreover, the processor 320 is further configured to associate a global session identity indicator value with the first session and to insert said value as the global session identity indicator in any subsequent messages sent from the IMS network node relating to the first session when it is determined that the received message does not comprise the global session identity indicator. The GSII may also be inserted in the received message. The input/output unit 310 is further configured to send the subsequent messages.

According to an embodiment, the IMS network node 300 further comprises a memory configured to store a mapping between the global session identity indicator and a local protocol dependent session identity indicator.

With reference to the scenario illustrated in FIG. 2, the input/output unit 310 is further configured to receive a message not comprising the global session identity indicator relating to the first session, wherein the message is a response of a request sent by said IMS network node, whereby the request comprised a global session identity indicator value. In this embodiment, the processor 320 is further configured to re-insert the GSII value, which was comprised in the request, as the global session identity indicator in any subsequent message sent from the IMS network node relating to the first session, and the input/output unit 310 is further configured to send the subsequent messages. It should be noted that the processor 320 may be configured to re-insert the GSII value, which was comprised in the request, as the global session identity indicator in the received message.

Modifications and other embodiments of the disclosed invention will come to mind to one skilled in the art having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method in an Internet Protocol, IP, Multimedia Subsystem, IMS, network node for enabling troubleshooting, the method comprising:
   receiving a message associated with a first session;
   determining whether the message comprises a global session identity indicator;
   based on determining that the message comprises the global session identity indicator then:
      determining a value of the global session identity indicator in the received message, and
      inserting said value as the global session identity indicator in any subsequent messages sent from the IMS network node relating to the first session,
   based on determining that the received message does not comprise the global session identity indicator then:
      associating a global session identity indicator value with the first session,
      inserting said global session identity indicator value as the global session identity indicator in any subsequent messages sent from the IMS network node relating to the first session, and
      sending the subsequent messages.

2. The method according to claim 1, further comprising:
   storing a mapping between the global session identity indicator and a local protocol dependent session identity indicator.

3. The method according to claim 2, further comprising:
   receiving a message not comprising the global session identity indicator relating to the first session, wherein the message is a response to a request sent by said IMS network node, whereby the request comprised a global session identity indicator value,
   re-inserting the global session identity indicator value, which was comprised in the request, as the global session identity indicator in the received message and in any subsequent message sent from the IMS network node relating to the first session, and
   sending the subsequent messages.

4. The method according to claim 1, wherein the global session identity indicator is inserted in a header of the message.

5. The method according to claim 4, wherein the local protocol dependent session is in accordance with Session Initiation Protocol, SIP.

6. The method according to claim 5, wherein the local protocol dependent session indicator is call-ID.

7. The method according to claim 1, wherein the global session identity indicator is inserted in an Attribute-value pairs, AVP, field.

8. The method according to claim 7, wherein the local protocol dependent session is in accordance with Diameter protocol.

9. The method according to claim 8, wherein the local protocol dependent session indicator is a hop-hop identifier or an end-to-end identifier.

10. The method according to claim 1, wherein the global session identity indicator is dependent on at least one of an IP address of an IMS network node and time.

11. The method according to claim 1, wherein said global session identity indicator value is inserted as the global session identity indicator in the received message when it is determined that the received message does not comprise the global session identity indicator.

12. An Internet Protocol, IP, Multimedia Subsystem, IMS, network node for enabling troubleshooting, comprising:
an input/output unit configured to receive a message associated with a first session; and
a processor configured to determine whether the message comprises a global session identity indicator,
the processor is further configured to determine a value of the global session identity indicator in the received message, and to insert said value as the global session identity indicator in any subsequent messages sent from the IMS network node relating to the first session when it is determined that the message comprises the global session identity indicator; and
the processor is further configured to associate a global session identity indicator value with the first session and to insert said global session identity indicator value as the global session identity indicator in the received message and in any subsequent messages sent from the IMS network node relating to the first session when it is determined that the received message does not comprise the global session identity indicator and the input/output unit is configured to send the subsequent messages.

13. The IMS network node according to claim 12, further comprising a memory, wherein the processor is further configured to store a mapping between the global session identity indicator and a local protocol dependent session identity indicator in the memory.

14. The IMS network node according to claim 13, wherein the input/output unit is further configured to receive a message not comprising the global session identity indicator relating to the first session, wherein the message is a response to a request sent by said IMS network node, whereby the request comprised a global session identity indicator value, the processor is further configured to re-insert the global session identity indicator value, which was comprised in the request, as the global session identity indicator in any subsequent message sent from the IMS network node relating to the first session, and the input/output unit further configured to send the subsequent messages.

15. The IMS network node according to claim 12, wherein the global session identity indicator is inserted in a header of the message.

16. The IMS network node according to claim 15, wherein the local protocol dependent session is in accordance with Session Initiation Protocol, SIP.

17. The IMS network node according to claim 16, wherein the local protocol dependent session indicator is call-ID.

18. The IMS network node according to claim 12, wherein the global session identity indicator is inserted in an Attribute-value pairs, AVP, field.

19. The IMS network node according to claim 18, wherein the local protocol dependent session is in accordance with Diameter protocol.

20. The IMS network node according to claim 19, wherein the local protocol dependent session indicator is a hop-hop identifier or an end-to-end identifier.

21. The IMS network node according to claim 12, wherein the global session identity indicator is dependent on at least one of an IP address of an IMS network node and time.

\* \* \* \* \*

UNITED STATES PATENT AND TRADEMARK OFFICE
CERTIFICATE OF CORRECTION

PATENT NO. : 9,219,756 B2  
APPLICATION NO. : 13/992452  
DATED : December 22, 2015  
INVENTOR(S) : Wåhl Page 1 of 1

It is certified that error appears in the above-identified patent and that said Letters Patent is hereby corrected as shown below:

IN THE DRAWINGS

In Fig. 7, Sheet 7 of 7, delete "C4 request" and insert -- Cx request --, therefor.

In Fig. 7, Sheet 7 of 7, delete "C4 response" and insert -- Cx response --, therefor.

IN THE CLAIMS

In Column 8, Line 21, in Claim 14, delete "unit further" and insert -- unit is further --, therefor.

Signed and Sealed this  
Twelfth Day of April, 2016

Michelle K. Lee  
*Director of the United States Patent and Trademark Office*